Feb. 16, 1943. J. B. LAU 2,311,116
NONSKID SHOE
Filed Dec. 18, 1940
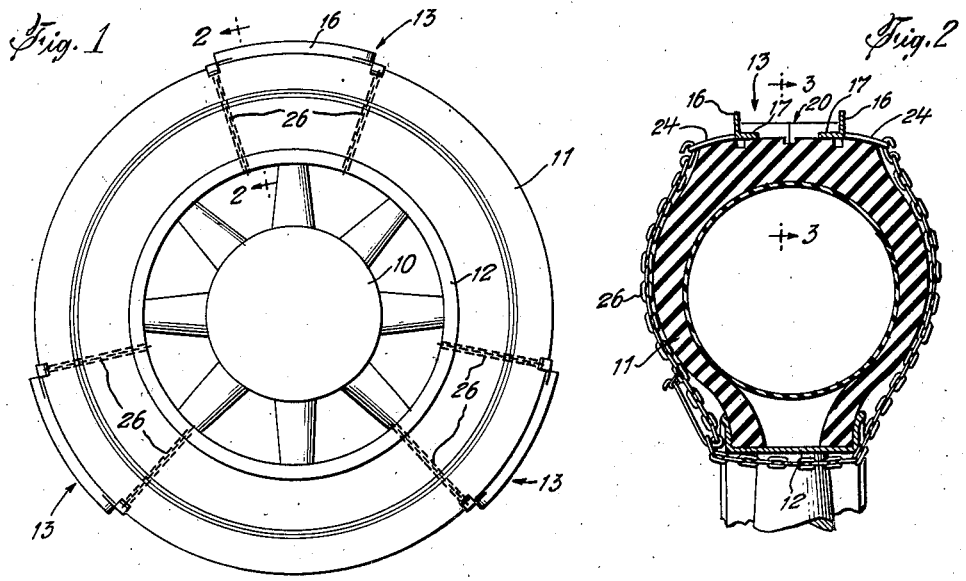
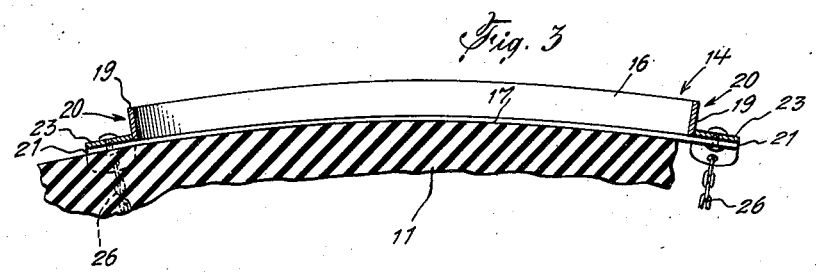
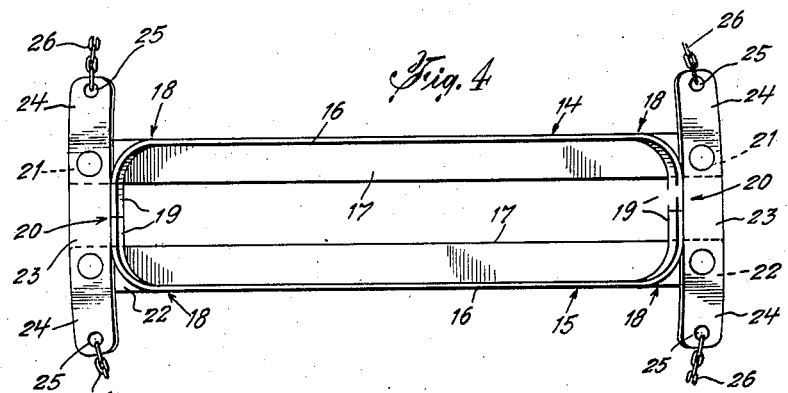
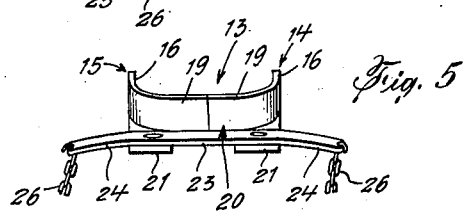
INVENTOR.
JOHN B. LAU
BY / Patented Feb. 16, 1943

2,311,116

UNITED STATES PATENT OFFICE 2,311,116

NONSKID SHOE

John B. Lau, Jersey City, N. J.

Application December 18, 1940, Serial No. 370,716

1 Claim. (Cl. 152—228)

This invention relates to non-skid devices for automotive vehicles, and aims to provide a non-skid shoe adapted to be attached singly or plurally to the tire of an automobile to serve as a means for preventing skidding of the vehicle on icy or slippery pavements.

Another object of the invention is the provision of such a non-skid shoe which is sturdy and durable in construction, inexpensive in cost of manufacture, and which may be easily and quickly attached or removed from the tire.

The above and other objects will become apparent in the description below, in which characters of reference refer to similarly numbered parts in the accompanying drawing which forms a part hereof. It is to be understood that the drawing serves the purpose of illustration only and it is not necessarily intended to limit the invention to the specific details of construction shown.

Referring briefly to the drawing, Figure 1 is a side elevational view of an automobile wheel, showing a plurality of the non-skid shoes attached thereto.

Figure 2 is a cross-sectional view taken on the line 2—2 of Figure 1.

Figure 3 is a cross-sectional view taken on the line 3—3 of Figure 2.

Figure 4 is a bottom plan view of the non-skid shoe per se.

Figure 5 is an end view of the same.

Referring in detail to the drawing, the numeral 10 indicates the wheel of an automobile having the pneumatic tire 11 thereon, the wheel felloe being shown at 12. The non-skid shoe is shown generically at 13.

The shoe 13 is formed primarily of a pair of identical complementary members 14 and 15. In the manufacture of the shoe, each member 14 and 15 is formed out of a single straight section of angle iron having the two webs 16 and 17 at mutually right angles. Each end of the angle irons is cut along the line of intersection of the webs 16 and 17 up to the point 18, after the entire angle iron has first been arched to the curvature of the tread of the size tire which it is to serve.

The tabs 19 thus freed from the ends of the angle iron are bent toward each other with their extremities in alignment so as to form the end walls 20 of the shoe. The tongues 21 and 22 which are likewise freed from the angle iron by the above cutting, obviously extend arcuately from the webs 17 in the same arc of curvature as their respective webs 17. The tongues 21 and 22 at each end of the shoe are riveted or otherwise secured to cross-pieces 23. The extremities 24 of the cross- or end-members 23 have holes 25 therein by means of which chains 26 are secured to the shoe for the purpose of removably securing it to the wheel in an obvious manner.

When attached to the tire, the outer edges of the webs 16 serve as rails on which the vehicle rides over the icy road. These rails naturally dig into the ice of the pavement and therefore not only grip into the ice but, in the event that the brakes should suddenly be applied, tend to cause the vehicle to follow in the same direction as the rails instead of to swing to one side as is usually the case. The end walls 20 of the shoe tend to resist forward movement when they contact the pavement with the brakes applied, thus slowing down the vehicle. Of course the rails do likewise when they are in contact with the pavement under similar circumstances. With the shoes of this invention applied to the tires, a skid off the road is an impossibility, as the rails 16 positively prevent a swinging of the vehicle upon application of the brakes, as appears obvious.

The height of the rails 16 permits of long life for the shoes, as they would have to be worn nearly completely away before the shoe would cease to function effectively. Thus, it is clear that the life of a set of such shoes would be many times as long as that of the usual non-skid devices or chains.

Obviously, modifications in form and structure may be made without departing from the spirit and scope of the invention.

I claim:

A non-skid shoe comprising a substantially rectangular member having the opposed sides thereof formed of complementary angle irons arched lengthwise to conform to the curvature of a tire, said webs of each of said angle irons having their ends separated from each other along the line of intersection to form extensions on said webs, cross-members at the ends of said shoe having the extensions of the base-forming pair of said webs secured thereto, the extensions at the ends of the upright pair of complementary webs being bent toward and into mutual contact with each other to form the opposed ends of said rectangular member, said upright pair of webs and said extensions thereof forming a continuous band-like member whose peripheral wall is of constant height and whose opposed lateral sides provide equidistant rails conforming to the curvature of the tire, and means for securing the shoe to the tire.

JOHN B. LAU.